United States Patent [19]
Leggett, III et al.

[11] Patent Number: 6,088,294
[45] Date of Patent: Jul. 11, 2000

[54] DRILLING SYSTEM WITH AN ACOUSTIC MEASUREMENT-WHILE-DRIVING SYSTEM FOR DETERMINING PARAMETERS OF INTEREST AND CONTROLLING THE DRILLING DIRECTION

[75] Inventors: James V. Leggett, III; Vladimir Dubinsky, both of Houston; John W. Harrell, Spring; William Thomas Balogh, Houston; Paul J. G. Seaton, The Woodlands; Andrew G. Brooks, Tomball; Roger P. Herbert, Spring, all of Tex.

[73] Assignee: Baker Hughes Incorporated, Houston, Tex.

[21] Appl. No.: 08/789,230

[22] Filed: Jan. 24, 1997

Related U.S. Application Data

[63] Continuation-in-part of application No. 08/371,879, Jan. 12, 1995, abandoned
[60] Provisional application No. 60/010,652, Jan. 26, 1996.

[51] Int. Cl.$^7$ .................................................. G01V 1/40
[52] U.S. Cl. ............................................ 367/25; 175/45
[58] Field of Search .................................... 181/104, 105; 367/25, 34, 31, 33; 175/40, 26; 73/152.03; 166/250.01; 364/421

[56] References Cited

U.S. PATENT DOCUMENTS

| | | | |
|---|---|---|---|
| 4,066,995 | 1/1978 | Matthews | 367/25 |
| 4,474,250 | 10/1984 | Dardick . | |
| 4,599,904 | 7/1986 | Fontenot . | |
| 4,601,024 | 7/1980 | Broding | 367/86 |

(List continued on next page.)

FOREIGN PATENT DOCUMENTS

| | | |
|---|---|---|
| 1098332 | 1/1968 | United Kingdom . |
| 1599067 | 9/1981 | United Kingdom . |
| WO 93/07514 | 4/1993 | WIPO . |
| WO96/21871 | 7/1996 | WIPO . |

OTHER PUBLICATIONS

Ashby Beal "Computer revolutionize downhole technology." *Petroleum News*, pp. 23–25 (Apr. 1983).

J. Aron, et al. Sonic "Compressional Measurement While Drilling." *SPWLA 35$^{th}$ Annual Logging Symposium*, pp. 1–17 (Jun. 19–22, 1994).

S. Beher "New Schlumberger Downhole Tools; LWD Sonic Collar and Downhole Adjustable Steerable System." Amoco Production Research Note pp. 1–2, PRN 9606 (Apr. 1993).

Shiyu Xu, et al. "Poro–eleasticity of clastic rocks; a unified model." *SPWLA 36$^{th}$ Annual Logging Symposium* pp. 1–12, (Jun. 26–29, 1995).

Aron et al, 35$^{th}$ Annual Logging Symposium, Jun. 19–22, 1994; Sonic Compressional Measurements While Drilling.

*Primary Examiner*—Christine K. Oda
*Assistant Examiner*—Victor J. Taylor
*Attorney, Agent, or Firm*—Madan, Mossman & Sriram, P.C.

[57] ABSTRACT

The present invention provides a system for drilling boreholes having a downhole subassembly which contains an acoustic measurement-while-drilling system. The acoustic system contains an acoustic transmitter and receiver for determining the acoustic velocity through the formations surrounding the borehole ad an acoustic transmitter and a set of receivers for determining the bed boundaries surrounding the borehole formation utilizing the acoustic velocities measured by the system. The downhole subassembly also contains a computing system which performs computations downhole and transmits certain answers uphole during the drilling operations. The bed boundary information is utilized to drill the wellbore along a desired wellbore path. The downhole computing system correlates the acoustic sensor measurements with other measurement-while-drilling measurements and transmits selected correlated information uphole. The downhole computing system contains predetermined well profile which is updated based on the bed boundary information. The system may be adapted to correct or update seismic data and offset well data based on acoustic sensor system measurements.

65 Claims, 8 Drawing Sheets

U.S. PATENT DOCUMENTS

| | | | |
|---|---|---|---|
| 4,665,511 | 5/1987 | Rodney et al. | 367/35 |
| 4,791,797 | 12/1988 | Paske et al. | |
| 4,833,914 | 5/1989 | Rasmus. | |
| 4,882,542 | 11/1989 | Vail, III. | |
| 4,903,245 | 2/1990 | Close et al. | 367/81 |
| 4,949,575 | 8/1990 | Rasmus. | |
| 5,036,945 | 8/1991 | Hoyle et al. | 181/104 |
| 5,058,077 | 10/1991 | Twist. | |
| 5,089,989 | 2/1992 | Schmidt et al. | 367/37 |
| 5,130,950 | 7/1992 | Orban et al. | |
| 5,163,521 | 11/1992 | Pustanyk et al. | 175/40 |
| 5,214,251 | 5/1993 | Orban et al. | |
| 5,309,404 | 5/1994 | Kostek et al. | |
| 5,317,111 | 5/1994 | Orban et al. | |
| 5,387,767 | 2/1995 | Aron et al. | 367/25 |
| 5,581,024 | 12/1996 | Meyer, Jr. et al. | 73/152.03 |
| 5,597,042 | 1/1997 | Tubel et al. | 166/250.01 |
| 5,602,541 | 2/1997 | Comeau et al. | 340/853.3 |
| 5,640,371 | 6/1997 | Schmidt et al. | 367/912 |
| 5,678,643 | 10/1997 | Robbins et al. | 175/45 |

DRILLING SYSTEM WITH AN ACOUSTIC MEASUREMENT-WHILE-DRIVING SYSTEM FOR DETERMINING PARAMETERS OF INTEREST AND CONTROLLING THE DRILLING DIRECTION

CROSS-REFERENCE TO RELATED APPLICATION

This application takes priorit form U.S. patent application Ser. No. 60/010,652, filed Jan. 26, 1996. This application is a continuation-in-part of U.S. application Ser. No. 08/371,879, filed on Jan. 12, 1995, now abandoned.

BACKGROUND OF THE INVENTION

1. Field of the Invention

This invention relates generally to systems for drilling boreholes for the production of hydrocarbons and more particularly to a drilling system having an acoustic measurement-while-drilling ("MWD") system as part of a bottomhole assembly for measuring acoustic velocities of subsurface formations during drilling of the wellbores and determining the location of formation bed boundaries around the bottomhole assembly. This invention also relates to controlling the drilling direction or the wellbore trajectories based on the location of the bed boundaries. For the purposes of this invention, the term "bed boundary" is used to denote a bed bounadry, a formation contrast, or a subsurface reflection point. This invention also provides a downhole system for correlating the acoustic measurements with other downhole sensor and MWD measurements and for mapping seismic data and/or modifying existing seismic data based on acoustic and other measurements made by the downhole assembly.

2. Description of the Related Art

To obtain hydrocarbons such as oil and gas, boreholes or wellbores are drilled through hydrocarbon-bearing subsurface formations. A large number of the current drilling activity involves drilling "horizontal" boreholes. Advances in the MWD measurements and drill bit steering systems placed in the drill string enable drilling of the horizontal boreholes with enhanced efficiency and greater success. Recently, horizontal boreholes, extending several thousand meters ("extended reach" boreholes), have been drilled to access hydrocarbon reserves at reservoir flanks and to develop satellite fields from existing offshore platforms. Even more recently, attempts have been made to drill boreholes corresponding to three-dimensional borehole profiles. Such borehole profiles often include several builds and turns along the drill path. Such three dimensional borehole profiles allow hydrocarbon recovery from multiple formations and allow optimal placement of wellbores in geologically intricate formations.

Hydrocarbon recovery can be maximized by drilling the horizontal and complex wellbores along optimal locations within the hydrocarbon-producing formations (payzones). Crucial to the success of these wellbores is (1) to establish reliable stratigraphic position control while landing the wellbore into the target formation and (2) to properly navigate the drill bit through the formation during drilling. In order to achieve such wellbore profiles, it is important to determine the true location of the drill bit relative to the formation bed boundaries and boundaries between the various fluids, such as the oil, gas and water. Lack of such information can lead to severe "dogleg" paths along the borehole resulting from hole or drill path corrections to find or to reenter the payzones. Such wellbore profiles usually limit the horizontal reach and the final wellbore length exposed to the reservoir. Optimization of the borehole location within the formation can also have a substantial impact on maximizing production rates and minimizing gas and water coning problems. Steering efficiency and geological positioning are considered in the industry among the greatest limitations of the current drilling systems for drilling horizontal and complex wellbores. Availability of relatively precise three-dimemsional subsurface seismic maps, location of the drilling assembly relative to the bed boundaries of the formation around the drilling assembly can greatly enhance the chances of drilling boreholes for maximum recovery. Prior art downhole lack in providing such information during drilling of the boreholes.

Modern directional drilling systems usually employ a drill string having a drill bit at the bottom that is rotated by a drill motor (commonly referred to as the "mud motor"). A plurality of sensors and MWD devices are placed in close proximity to the drill bit to measure certain drilling, borehole and formation evaluation parameters. Such parameters are then utilized to navigate the drill bit along a desired drill path. Typically, sensors for measuring downhole temperature and pressure, azimuth and inclination measuring devices and a formation resistivity measuring device are employed to determine the drill string and borehole-related parameters. The resistivity measurements are used to determine the presence of hydrocarbons against water around and/or a short distance in front of the drill bit. Resistivity measurements are most commonly utilized to navigate or "geosteer" the drill bit. However, the depth of investigation of the resistivity devices usually extends to 2–3 meters. Resistivity measurements do not provide bed boundary information relative to the downhole subassembly. Furthermore, error margin of the depth-measuring devices, usually deployed on the surface, is frequently greater than the depth of investigation of the resistivity devices. Thus, it is desirable to have a downhole system which can relatively accurately map the bed boundaries around the downhole subassembly so that the drill string may be steered to obtain optimal borehole trajectories.

Thus, the relative position uncertainty of the wellbore being drilled and the critical near-wellbore bed boundary or contact is defined by the accuracy of the MWD directional survey tools and the formation dip uncertainty. MWD tools are deployed to measure the earth's gravity and magnetic field to determine the inclination and azimuth. Knowledge of the course and position of the wellbore depends entirely on these two angles. Under normal operating conditions, the inclination measurement accuracy is approximately plus or minus 0.2°. Such an error translates into a target location uncertainty of about 3.0 meters per 1000 meters along the borehole. Additionally, dip rate variations of several degrees are common. The optimal placement of the borehole is thus very difficult to obtain based on the currently available MWD measurements, particularly in thin payzones, dipping formation and complex wellbore designs.

Recently, PCT application No. PCT/NO/00183 filed by Statoil Corp. disclosed the use of acoustic sensors having a relatively short spacing between the receivers and the transmitter to determine the formation bed boundaries around the downhole subassembly. An essential element in determining the bed boundaries is the determination of the travel time of the reflection acoustic signals from the bed boundaries or other interface anomalies. This application proposes utilizing estimates of the acoustic velocities obtained from prior seismic data or offset wells. Such acoustic velocities are not very precise because they are estimates of actual formation acoustic velocities. Also, since the depth measurements can be off by several meters from the true depth of the downhole subassembly, it is highly desirable to utilize actual acoustic formation velocities determined downhole during the drilling operations to determine the location of bed boundaries relative to the drill bit location in the wellbore.

Additionally, for acoustic or sonic sensor measurements, the most significant noise source is due to acoustic signals travelling from the source to the receivers via the metallic tool housing (commonly referred to as the "body waves") and the mud column surrounding the downhole subassembly (commonly referred to as the "tube waves"). The Statoil application discloses acoustic sensor designs to achieve a certain amount of directivity of signals. It also discloses a transmitter coupling scheme and signal processing method for reducing the effects of the tube wave and the body waves. Such methods, however, alone do not provide sufficient reduction of the tube and body wave effects, especially due to strong direct coupling of the acoustic signals between the transmitters and their associated receivers.

The present invention addresses the above-noted needs and provides a system for drilling boreholes wherein the bottomhole subassembly includes an acoustic MWD system having one acoustic sensor arrangement that is utilized to determine the acoustic velocities of the borehole formations during drilling and another acoustic sensor arrangement for determining bed boundary information based on the formation acoustic velocities measured downhole. Novel acoustic sensor arrangements are disclosed for relatively precisely determining the bed boundary information. Acoustic isolators between the transmitters and their associated receivers are provided to reduce the body wave and tube wave effects. Any number of additional MWD devices or sensors may be included in the bottomhole assembly to obtain additional information about the borehole and the surrounding formations. A steering device or system is included in the bottomhole assembly which can be operated downhole and/or from the surface to steer the drill bit to drill the wellbore along the desired path.

The system of the present invention correlates measurements from the various MWD devices and sensors to provide parameters of interest relating to the drilling operations and formation evaluation. The bed boundary information may be utilized to map the borehole profile, to update or modify seismic data stored in the downhole subassembly and to steer the drill bit so as to obtain the desired borehole profile. The bed boundary and other information computed downhole may be stored downhole for later retrieval and use. Additionally, selected parameters of interest and other information are transmitted to the surface during the drilling operations to aid the driller in controlling the drilling operations including accurately geosteering the drill string.

SUMMARY OF THE INVENTION

The present invention provides a closed-loop system for drilling boreholes. The system includes a drill string having a drill bit and a downhole subassembly having a plurality of sensors and measurement-while-drilling devices, a downhole computing system and a two-way telemetry system for computing downhole bed boundary information relative to the downhole subassembly. The downhole subassembly includes an acoustic MWD system which contains a first set of acoustic sensors for determining the formation acoustic velocities during drilling of the wellbore and a second set of acoustic sensors that utilizes the acoustic velocities measured by the system for determining bed boundaries around the downhole subassembly. A computing system is provided within the downhole subassembly which processes downhole sensor information and computes the various parameters of interest including the bed boundaries, during drilling of the wellbore.

In one embodiment, the first and second sets (arrangements) of acoustic sensors contain a transmitter and a receiver array, wherein the transmitter and some of the receivers in the receiver array are common to both sets of acoustic sensors. Each receiver in the receiver array further may contain one or more individual acoustic sensors. In one configuration, the distance between the transmitter and the farthest receiver in one of the acoustic sensor sets is substantially greater than the distance between the transmitter and center of the receivers in the second set. The downhole computing system contains programmed instructions, models, algorithms and other information, including information from prior drilled boreholes, geological information about the subsurface formations and the borehole drill path.

In an alternative embodiment, the acoustic system contains a common transmitter and identical acoustic receiver arrays placed symmetrically on either side of the transmitter axially along the downhole subassembly. In one configuration of such embodiment, a separate stabilizer is placed equidistant between the transmitter and each of the receiver arrays to cause substantially the same amount of reflections of the transmitted acoustic signals. The symmetrical arrangement aids in substantially reducing the effects of the body wave acoustic noise, tube wave acoustic noise associated with the acoustic system and other acoustic waves (compressional waves, shear waves, etc.) propagating along the borehole. Additionally, acoustic isolators may be placed between the transmitter and each of the receiver arrays to dampen the direct acoustic signals between the transmitter and receives and to increase the travel time therebetween so as to reduce the effect of body waves and tube waves on the receivers.

The acoustic system of the present invention determines the actual formation velocities downhole during drilling of the wellbore ad then utilizes such formation velocities to determine the bed boundaries around the downhole subassembly. The drill bit location is computed downhole or is provided to the downhole subassembly from surface measurements. The bed boundary information is utilized to geosteer the drill string so as to maintain the borehole at a desired place within the formation. The acoustic velocity and bed boundary information is utilized to correct or update seismic maps and to correlate measurements from other MWD measurements.

The present invention also provides a method for drilling a borehole utilizing a downhole subassembly having a first and second acoustic sensor arrangement and a computing system for computing measurements downhole during the drilling of the borehole. The method comprises: (a) conveying the downhole subassembly along the wellbore; (b) determining downhole, by the computing system, the velocity of acoustic signals through formations near the downhole subassembly from measurements made from the first acoustic sensor arrangement; and (c) determining downhole, by the computing system, bed boundaries of the formations from measurements from the second acoustic sensor arrangement and the determined acoustic velocities in accordance with programmed instructions provided to the computing system. The drilling direction is adjusted based on the location of the downhole assembly in relation to the formation bed boundaries.

Examples of the more important features of the invention thus have been summarized rather broadly in order that the detailed description thereof that follows may be better understood, and in order that the contributions to the art may be appreciated. There are, of course, additional features of the invention that will be described hereinafter and which will form the subject of the claims appended hereto.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals and wherein:

FIG. 5b shows graphically the common mode deterministic noise reduction for the acoustic sensor configuration shown in FIG. 5a.

FIG. 6 shows a functional block diagram for canceling the background noise in the configuration of the acoustic sensor system shown in FIG. 5a.

DESCRIPTION OF THE PREFERRED EMBODIMENT

In general, the present invention provides a drilling system for drilling of boreholes. The drilling system contains a drill string having a downhole subassembly that includes a drill bit at its bottom end and a plurality of sensors and MWD devices, including an acoustic MWD system having a first set of acoustic sensors for determining the formation acoustic velocity while drilling the borehole and a second set of acoustic sensors for determining the bed boundaries by utilizing the acoustic velocity measurements made by the first set of acoustic sensors. A downhole computer and associated memory are provided for computing various downhole operating parameters, to map the formation around the downhole subassembly, to update stored models and data as a result of the computed parameters and to aid the driller in navigating the drill string along a desired wellbore profile.

The system of the invention also preferably includes devices for determining the formation resistivity, gamma ray intensity of the formation, the drill string inclination and the drill string azimuth, nuclear porosity of the formation and the formation density. The drill string may contain other MWD devices known in the art for providing information about the subsurface geology, borehole conditions and mud motor operating parameters, such as the differential pressure across the mud motor, torque and the condition of the bearing assembly. Selected data is transmitted between the downhole subassembly and surface computing apparatus via a two-way telemetry system. The surface computing apparatus transmits signals to the downhole subassembly for controlling certain desired operations and also for processing the received data according to programmed instruction to improve the drilling operations.

Figure 1:
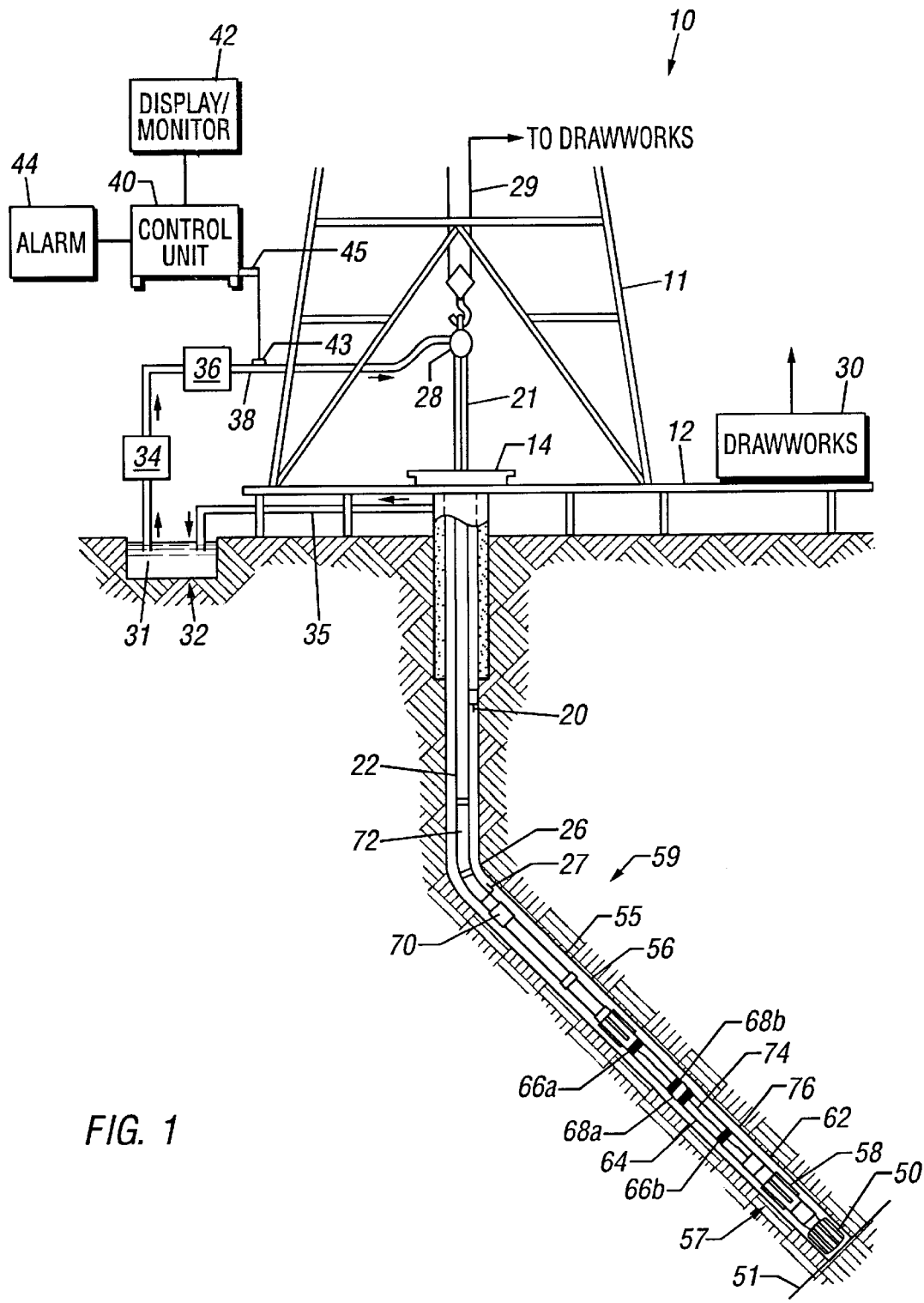
FIG. 1 shows a schematic diagram of a drilling system having a drill string that includes an acoustic sensor system according to the present invention.

FIG. 1 shows a schematic diagram of a drilling system 10 having a downhole assembly containing an acoustic sensor system and the surface devices according to one embodiment of present invention. As shown, the system 10 includes a conventional derrick 11 erected on a derrick floor 12 which supports a rotary table 14 that is rotated by a prime mover (not shown) at a desired rotational speed. A drill string 20 that includes a drill pipe section 22 extends downward from the rotary table 14 into a borehole 26. A drill bit 50 attached to the drill string downhole end disintegrates the geological formations when it is rotated. The drill string 20 is coupled to a drawworks 30 via a kelly joint 21, swivel 28 and line 29 through a system of pulleys 27. During the drilling operations, the drawworks 30 is operated to control the weight on bit and the rate of penetration of the drill string 20 into the borehole 26. The operation of the drawworks is well known in the art and is thus not described in detail herein.

During drilling operations a suitable drilling fluid (commonly referred to in the art as "mud") 31 from a mud pit 32 is circulated under pressure through the drill string 20 by a mud pump 34. The drilling fluid 31 passes from the mud pump 34 into the drill string 20 via a desurger 36, fluid line 38 and the kelly joint 21. The drilling fluid is discharged at the borehole bottom 51 through an opening in the drill bit 50. The drilling fluid circulates uphole through the annular space 27 between the drill string 20 and the borehole 26 and is discharged into the mud pit 32 via a return line 35. Preferably, a variety of sensors (not shown) are appropriately deployed on the surface according to known methods in the art to provide information about various drilling-related parameters, such as fluid flow rate, weight on bit, hook load, etc.

A surface control unit 40 receives signals from the downhole sensors and devices via a sensor 43 placed in the fluid line 38 and processes such signals according to programmed instructions provided to the surface control unit. The surface control unit displays desired drilling parameters and other information on a display/monitor 42 which information is utilized by an operator to control the drilling operations. The surface control unit 40 contains a computer, memory for storing data, data recorder and other peripherals. The surface control unit 40 also includes models and processes data according to programmed instructions and responds to user commands entered through a suitable means, such as a keyboard. The control unit 40 is preferably adapted to activate alarms 44 when certain unsafe or undesirable operating conditions occur.

A drill motor or mud motor 55 coupled to the drill bit 50 via a drive shaft (not shown) disposed in a bearing assembly 57 rotates the drill bit 50 when the drilling fluid 31 is passed through the mud motor 55 under pressure. The bearing assembly 57 supports the radial and axial forces of the drill bit, the downthrust of the drill motor and the reactive upward loading from the applied weight on bit. A stabilizer 58 coupled to the bearing assembly 57 acts as a centralizer for the lowermost portion of the mud motor assembly.

In the preferred embodiment of the system of present invention, the downhole subassembly 59 (also referred to as the bottomhole assembly or "BHA") which contains the various sensors and MWD devices to provide information about the formation and downhole drilling parameters and the mud motor, is coupled between the drill bit 50 and the drill pipe 22. The downhole assembly 59 preferably is modular in construction, in that the various devices are interconnected sections so that the individual sections may be replaced when desired.

Still referring back to FIG. 1, the BHA also preferably contains sensors and devices in addition to the above-described sensors. Such devices include a device for measuring the formation resistivity near and/or in front of the drill bit, a gamma ray device for measuring the formation gamma ray intensity and devices for determining the inclination and azimuth of the drill string. The formation resistivity measuring device 64 is preferably coupled above the lower kick-off subassembly 62 that provides signals, from which resistivity of the formation near or in front of the drill bit 50 is determined. A dual propagation resistivity device ("DPR") having one or more pairs of transmitting antennae 66a and 66b spaced from one or more pairs of receiving antennae 68a and 68b is used. Magnetic dipoles are employed which operate in the medium frequency and lower high frequency spectrum. In operation, the transmitted electromagnetic waves are perturbed as they propagate through the formation surrounding the resistivity device 64. The receiving antennae 68a and 68b detect the perturbed waves. Formation resistivity is derived from the phase and amplitude of the detected signals. The detected signals are processed by a downhole circuit that is preferably placed in a housing 70 above the mud motor 55 and transmitted to the surface control unit 40 using a suitable telemetry system 72.

The inclinometer 74 and gamma ray device 76 are suitably placed along the resistivity measuring device 64 for respectively determining the inclination of the portion of the drill string near the drill bit 50 and the formation gamma ray intensity. Any suitable inclinometer and gamma ray device, however, may be utilized for the purposes of this invention. In addition, an azimuth device (not shown), such as a magnetometer or a gyroscopic device, may be utilized to determine the drill string azimuth. Such devices are known in the art and are, thus, not described in detail herein. In the above-described configuration, the mud motor 55 transfers power to the drill bit 50 via one or more hollow shafts that run through the resistivity measuring device 64. The hollow shaft enables the drilling fluid to pass from the mud motor 55 to the drill bit 50. In an alternate embodiment of the drill string 20, the mud motor 55 may be coupled below resistivity measuring device 64 or at any other suitable place.

The drill string contains a modular sensor assembly, a motor assembly and kick-off subs. In a preferred embodiment, the sensor assembly includes a resistivity device, gamma ray device and inclinometer, all of which are in a common housing between the drill bit and the mud motor. Such prior art sensor assemblies would be known to those versed in the art and are not discussed further.

The downhole assembly of the present invention preferably includes a MWD section 78 which contains a nuclear formation porosity measuring device, a nuclear density device and an acoustic sensor system placed above the mud motor 64 in the housing 78 for providing information useful for evaluating and testing subsurface formations along borehole 26. The preferred configurations of the acoustic sensor system are described later with reference to FIGS. 3a, 3b and 5a. The present invention may utilize any of the known formation density devices. Any prior art density device using a gamma ray source may be used. In use, gamma rays emitted from the source enter the formation where they interact with the formation and attenuate. The attenuation of the gamma rays is measured by a suitable detector from which density of the formation is determined.

The porosity measurement device preferably is the device generally disclosed in U.S. Pat. No. 5,144,126, which is assigned to the assignee hereof and which is incorporated herein by reference. This device employs a neutron emission source and a detector for measuring the resulting gamma rays. In use, high energy neutrons are emitted into the surrounding formation. A suitable detector measures the neutron energy delay due to interaction with hydrogen and atoms present in the formation. Other examples of nuclear logging devices are disclosed in U.S. Pat. Nos. 5,126,564 and 5,083,124.

The above-noted devices transmit data to the downhole telemetry system 72, which in turn transmits the received data uphole to the surface control unit 40. The downhole telemetry also receives signals and data from the uphole control unit 40 and transmits such received signals and data to the appropriate downhole devices. The present invention preferably utilizes a mud pulse telemetry technique to communicate data from downhole sensors and devices during drilling operations. A transducer 43 placed in the mud supply line 38 detects the mud pulses responsive to the data transmitted by the downhole telemetry 72. Transducer 43 generates electrical signals in response to the mud pressure variations and transmits such signals via a conductor 45 to the surface control unit 40. Other telemetry techniques such electromagnetic and acoustic techniques or any other suitable technique may be utilized for the purposes of this invention.

Figure 2:
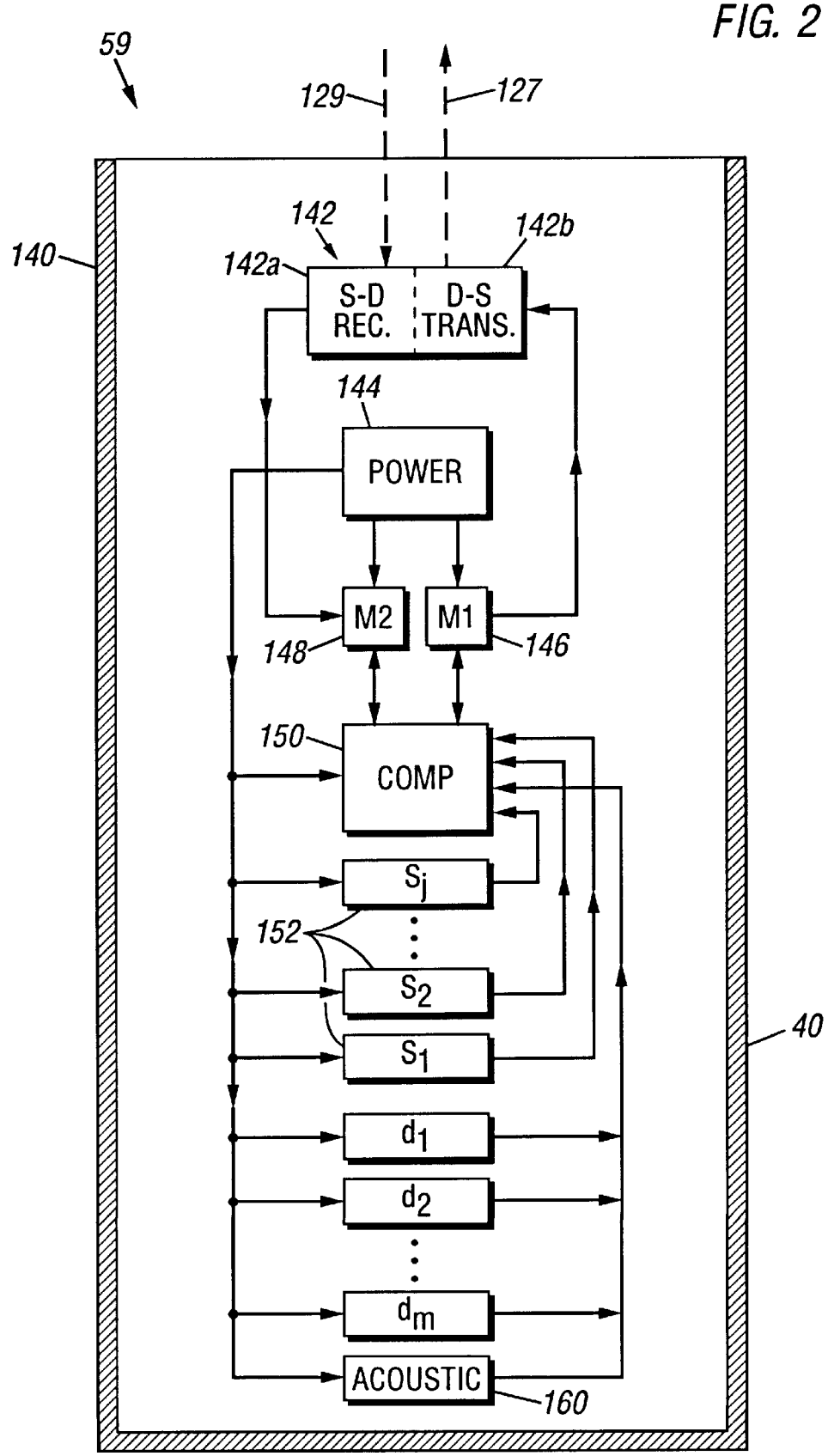
FIG. 2 shows a functional block diagram of the major downhole elements of the system shown in FIG. 1.

FIG. 2 shows a functional block diagram of the major elements of the downhole subassembly 59 and further illustrates the data communication paths between the various system elements. It should be noted that FIG. 2 illustrates only one arrangement of the elements and a system of data communication therebetween. Other arrangements may be utilized equally effectively for the purpose of this invention. For convenience, the sensors for determining the downhole operating conditions and the downhole assembly health are denoted by $S_1-S_j$, the acoustic sensor system is denoted by numeral 160 while the remaining downhole MWD devices, such as the nuclear, electromagnetic, directional and the like, are denoted by $d_1-d_m$. The sensors $S_1-S_j$, MWD devices $d_1-d_m$ and the desired acoustic sensor system 160 are arranged within the downhole subassembly in a desired manner. During operation, a predetermined number of discrete data points output from the sensors and MWD devices are stored within a buffer which, in FIG. 2, is included as a partitioned portion of the memory capacity of the computer 150. Alternatively, the buffer storage can comprise a separate element (not shown).

Sensor response relationships or "models" for the acoustic sensor system and other sensors in the downhole subassembly are preferably stored in a memory 148. These models are determined mathematically and/or by measuring responses of the sensors in a known test formations. In addition, other reference data such as data defining the targeted formations to be drilled, seismic data, offset well data is preferably stored downhole in the memory 148. A two-way data and command signal communications are provided between the computer 150 and the second memory 148. The responses from the sensors $S_1-S_j$, $d_1-d_m$ and 160 are transmitted to the computer 150 wherein they are transformed into parameters of interest or answers as described later. The downhole electronics for processing signals downhole and to perform other computations includes the computer or controller 150, first and second memory 148 and 146, and other desired components, such as signals processors, amplifiers, etc. (not shown). For simplicity, the use of such components is known and are thus, not included in FIG. 2.

Still referring to FIG. 2, the parameters of interest are transmitted to the surface via the up-link telemetry path 127 or stored in the memory 146 for subsequent retrieval at the surface. Since the acoustic sensor system 160 and other sensors 152 and $d_1-d_m$ are placed axially along the downhole subassembly, their responses do not correspond to the same measure point within the borehole 26 (see FIG. 1). Prior to combining or correlating the data from different sensors, the computer 150 shifts the data to a common depth point. Also, the various devices $d_1-d_m$ do not necessarily exhibit the same vertical resolution. Therefore, vertical resolution matching is performed by the computer 150 before combining or correlating measurements from different sensors.

Once computed from the depth-shifted and resolution-matched data, the parameters of interest are then passed to the downhole transmitter element 142*b* of the telemetry system 142 and subsequently telemetered to the surface by a suitable up-link telemetry link illustrated conceptually by the broken line 127. The power source 144 supplies power to the telemetry element 142, computer 150, memories 146 and 148 and associated control circuits (not shown). Information from the surface is transmitted over the downlink telemetry path illustrated conceptually by the broken arrow 129 to the downhole receiving element 142*a* of the downhole telemetry unit 142, and then transmitted to the data storage unit 148 for subsequent use.

Figure 3A:
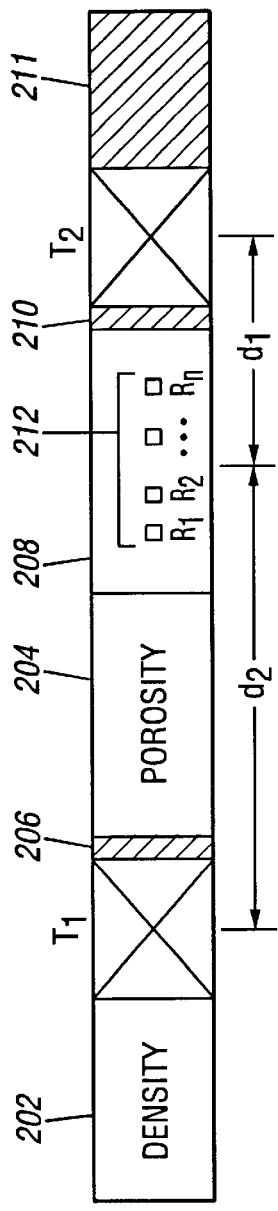
FIG. 3a shows an embodiment of the acoustic sensor system for use in the system of the present invention.

FIG. 3*a* is a schematic diagram of a portion 200 of the downhole subassembly showing an embodiment of the acoustic system of the present invention placed in the MWD section 78 shown in FIG. 1. The subsystem of FIG. 3*a* is preferably placed between the mud motor 55 and the downhole telemetry section 72. The subsystem 200 contains a nuclear density device 202 and a nuclear porosity device 204 of the type described earlier, separated by an acoustic isolator section 206. The density device 202 and the porosity device 204 may be enclosed in a common housing 208 or formed as individual sections or modules. A first acoustic transmitter or a set of transmitters $T_1$ is placed between the density device 202 and the first isolator 206. A second acoustic transmitter or set of transmitters $T_2$ is placed past the porosity device and a second acoustic isolator 210. A plurality of acoustic receivers $R_1-R_n$ are placed axially spaced from each other between the transmitters $T_1$ and $T_2$. The distance $d_2$ between the transmitter $T_1$ and the center of the far receiver of the array 212 is preferably less than four and one half (4.5) meters while the distance $d_1$ between transmitter $T_2$ and the near receiver of the array 212 is no less than ten (10) centimeters.

Each of the transmitters and the receivers are coupled to electronic circuitry (not shown) which causes the acoustic transmitters to generate acoustic pulses at predetermined time intervals and the receivers to receive any reflected acoustic signals from the borehole formations. In one mode of operation, the acoustic system for determining the formation acoustic velocities is selectively activated when drilling and the acoustic system for determining the bed boundary information is activated when the drilling activity is stopped so as to substantially reduce acoustic noise generated by the drill bit. In an alternative mode of operation, both the velocity and bed boundary measurements may be while the drilling is in progress. Other suitable modes of operation may also be utilized in the system of the present invention.

In the present system, an array of two or more receivers is preferred over a smaller number of receivers to obtain more accurate acoustic measurements. It is known that the quality of acoustic measurements may be enhanced by utilizing receiver arrays having a large number of receivers. In operation, the transmitters are preferably energized several times over a known time period and the received signals are stacked to improve resolution. Such data processing techniques are known in the art and are thus not described in detail herein. The transmitter $T_1$ is preferably operated at a preselected frequency between 5 to 20 KHz while the transmitter $T_2$ is operated at a frequency between 100 Hz to 5 KHz. The downhole computer 150 determines the time of travel of the acoustic signals and thus the velocity of the acoustic signals through the formation by processing signals from the first transmitter T1 and the receivers 212 by utilizing any of the methods known in the art. The computer then determines the distance between a measure point in the subassembly 200 and the bed boundaries around the downhole subassembly from data received by the receivers in response to the signals transmitted by the transmitter $T_2$ and by utilizing the actual acoustic velocity measurements determined by the computer.

As noted previously, the distance $d_2$ is preferably less than 4.5 meters, which has been determined in the art to be sufficient for determining the acoustic velocities through the formations surrounding the transmitter and receiver array. However, large distance between the transmitter and receiver is detrimental in that the tube waves and body waves may constitute dominant signals received by the receivers, which are then filtered or removed by mathematical techniques known in the art, prior to processing the signals reflected from the bed boundaries. In order to reduce the effects of the body waves, acoustic isolators 206 and 208 are respectively placed between the transmitters $T_1$ and $T_2$ and the receivers. A portion of the isolator preferably extends beyond the housing 211, i.e., into the annulus between the borehole and the downhole subassembly so as to dampen or reduce the direct coupling effect of the tube waves. The transmitters may be operated by sweeping the frequencies within their respective ranges or may be operated at different discrete multiple frequencies to remove the noise and to thereby improve the signal quality. The downhole computer 150 may be programmed to operate the acoustic sensor systems at the desired frequencies and the desired time intervals. The frequency used typically depends upon the depth of investigation and resolution desired for a particular application.

Figure 3B:
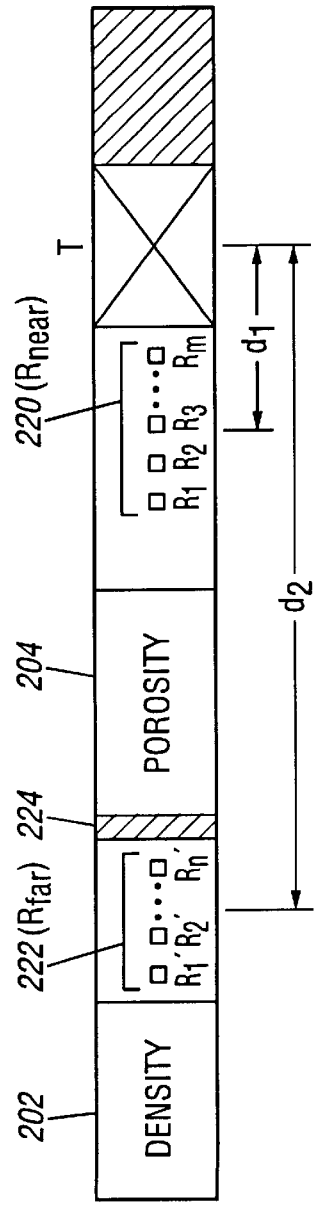
FIG. 3b shows an alternative embodiment of the acoustic sensor system for use in the system of the present invention.

The acoustic system embodiment of FIG. 3*a* shows two transmitter and a single receiver array. Some or all of the receivers in the array may be utilized as the short-spaced receivers and similarly some or all receivers in the array may be utilized as the long-spaced receivers. The acoustic elements in the present invention may be configured to contain a single transmitter and a short-spaced receiver or receiver array and a long-spaced receiver or receiver array as shown in FIG. 3*b*. In such a configuration, the single transmitter T is preferably placed at one end of the subassembly and a near receiver array ($R_{near}$) 220 having receivers $R_1$–$R_m$ is placed at a distance d, and a far receiver array ($R_{far}$) 222 having receivers $R'_1$–$R'_n$ is placed at a distance $d_2$ from the transmitter T. The acoustic isolator 224 in this configuration is placed between the transmitter T and the long-spaced receiver array 222. The single transmitter T may be operated during one time interval at a first frequency or set of frequencies for the short-spaced receivers 220 and operated in a second time interval at a second frequency or set of frequencies for the long-spaced receivers 222. In the configurations shown in FIG. 3a–b, all of the acoustic sensors are placed above the mud motor 55. Alternatively, some of the receivers may be placed above the mud motor and the others below the mud motor.

Figure 4:
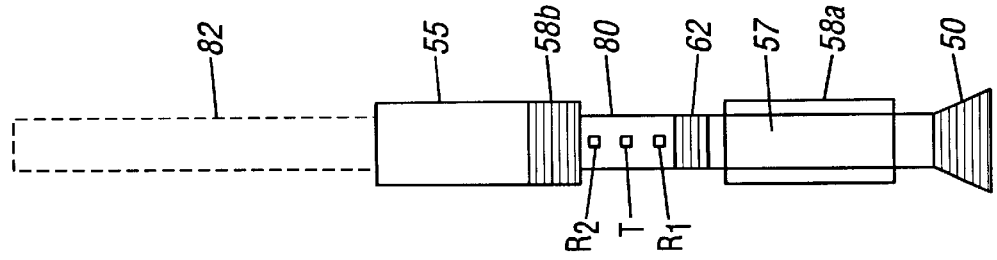
FIG. 4 shows an acoustic sensor system arrangement placed between the mud motor and the drill bit for use in the system of FIG. 1.

FIG. 4 shows an alternative embodiment of the downhole subassembly containing the acoustic system. In this configuration, the acoustic sensors (transmitters and receivers) are placed between the drill bit 50 and the mud motor power section 55 section. The lower stabilizer 58a and upper stabilizer 58b are utilized as acoustic noise isolators. The lower stabilizer 58a is mounted on a collar section 57. An additional isolator 62 may be used. The acoustic sensors are preferably disposed in the housing which contains the resistivity measuring device, the gamma ray density device and the inclinometer, collectively denoted by numeral 80. The remaining elements of the downhole subassembly are contained in the section denoted by numeral 82. The acoustic receivers $R_1$ and $R_2$ are preferably arranged symmetrically about the transmitter T so as to cancel the direct coupling acoustic noise during processing of the received reflected signals, as more fully described below in reference to FIGS. 5a–5c.

Figure 5A:
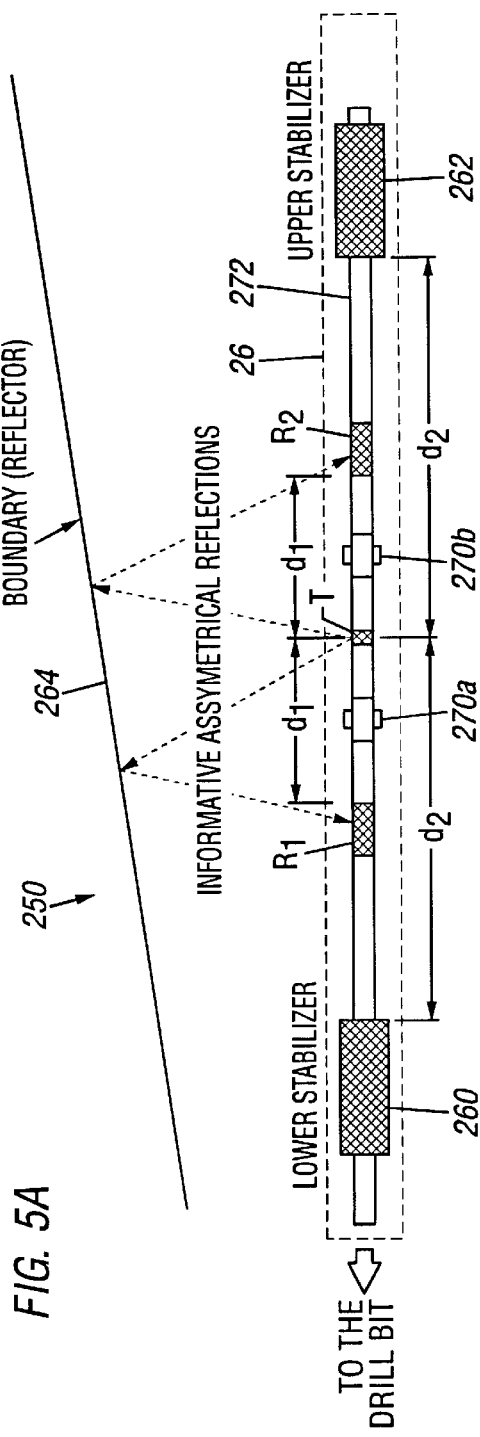
FIG. 5a shows a schematic diagram of an application of the acoustic system configuration of FIG. 4 in a formation having a relatively small dip angle.
Figure 5B:
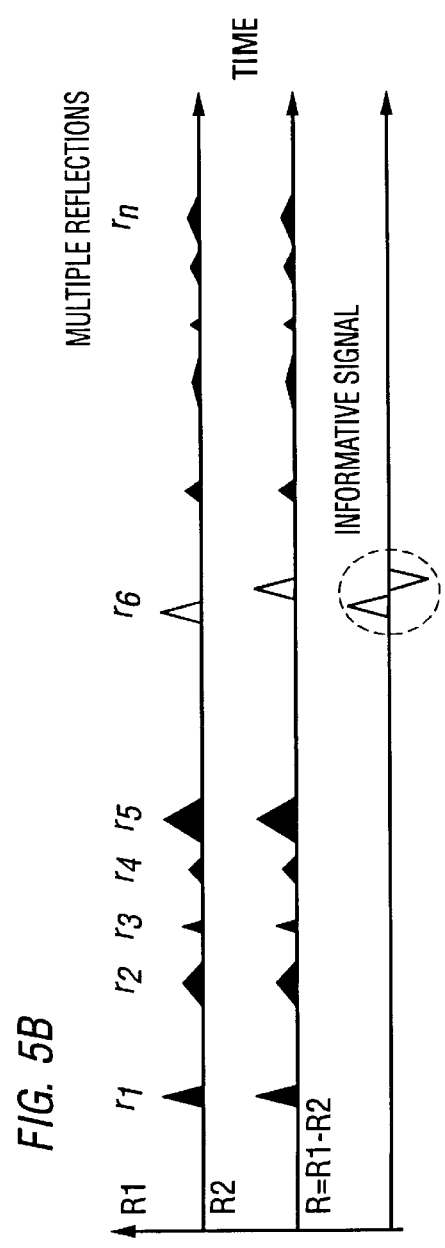

FIG. 5a shows the acoustic sensor system 250 within a borehole 26, the sensor system having two receivers or arrays of receivers R1 and R2 placed symmetrically about a transmitter between two substantially identical stabilizers 260 and 262 placed on either side of the transmitter T. In such a configuration, all deterministic signals relating to the acoustic transmitter (drill string body signals, acoustic pressure wave or the "P" signals, acoustic shear wave or the "S" signals, tube waves and the reflections caused by the stabilizers) arrive at each pair of the symmetrically placed receivers at the same time with identical amplitudes as shown by amplitude versus time reflection waves shown in FIG. 5b. Signals received by each of the receivers of the receiver arrays $R_1$ and $R_2$ are labeled $r_1$ to $r_n$. As shown in FIG. 5b, the receivers R1 and R2 each receive the identical signals at the same time. The signals received by each receiver pair are subtracted from each other to determine the differential for the corresponding pair of receivers. In this manner, the common noise signals cancel out leaving the informative or useful reflection signals as the differential signals except in certain unique situation, such as when the acoustic sensor array is exactly parallel to the reflecting bed boundary. In such situations, the system may be adapted to process signals from each receiver or receiver arrays independently to determine the bed boundary conditions. As shown in FIG. 5a, the informative signals $r_6$ that correspond to the reflections from the bed boundary 264 do not cancel out because they arrive at the receivers $R_1$ and $R_2$ at different times. Even when the reflected signals arrive from a bed boundary that is parallel to the acoustic array, the presence of zero sensor signal indicates that the bed boundary is parallel to acoustic array, in which case the signal processing may be done by utilizing conventional non-symmetrical processing techniques. It should be noted that each receiver in any of the embodiments may contain one or more acoustic sensors.

Still referring to FIG. 5a, the acoustic system may include one or more acoustic isolators such as isolators 270a and 27b respectively placed between the transmitter and the receiver arrays R1 and R2 to reduce the effect of the body waves and tube waves between the transmitter and the receivers. A portion of the these isolators preferably extends a certain distance beyond the housing 272 so as to reduce the effect of the tube waves. These isolators may be partially embedded in the housing 272 and may be made from any desired material or combination of materials. As an example, the body wave isolation portion may be made from a suitable elastomeric material while the tube wave portion of the isolator may be made from a suitable metal.

As described earlier, the system may be adapted to utilize multi-frequency acoustic pulses. In some cases, the sequential use of different excitation frequencies for the short-spaced receivers can be successfully used for calculating the distance between downhole subassembly and the bed boundary. This is due to the fact that for various formation properties (porosity, permeability, pore sizes, lithology, etc.) the quality of the acoustic wave propagation through the medium could be different for different frequencies. In such cases, multi-frequency investigation with a correlation analysis may be utilized to obtain more accurate interpretation of the results.

Any suitable transmitter and receiver design may be utilized in the system of the present invention. U.S. patent application Ser. No. 08/371,879, now U.S. Pat. No. 5,679,894. of James V. Leggett III, which is incorporated herein by reference, discloses segmented acoustic sensors and the methods of utilizing such sensors that may be utilized in the system of the present invention. Other prior art sensors using segmented acoustic sensors may also be used in this invention.

Any known signal processing method may be utilized for processing the acoustic signals in this invention. The processing techniques are substantially similar to the well known seismic signals processing techniques, particularly the single well seismic techniques. Such techniques include making preliminary corrections (static and dynamic), building stacked data sets, convolution and time-varying Weiner methods and other shaping filtering techniques and seismic filtering techniques, such as casual feedforward filtering, casual feedback filtering, minimum delay, and least square wavelet filtering, etc. The system preferably utilizes noise cancellation and sensitive echo detection methods for improving the quality of the acoustic signals. Such methods are typically based on known signal processing techniques, such as the complex transfer function calculation, spectral and Cepstrum analysis, Hilbert transform, etc.

Figure 6:
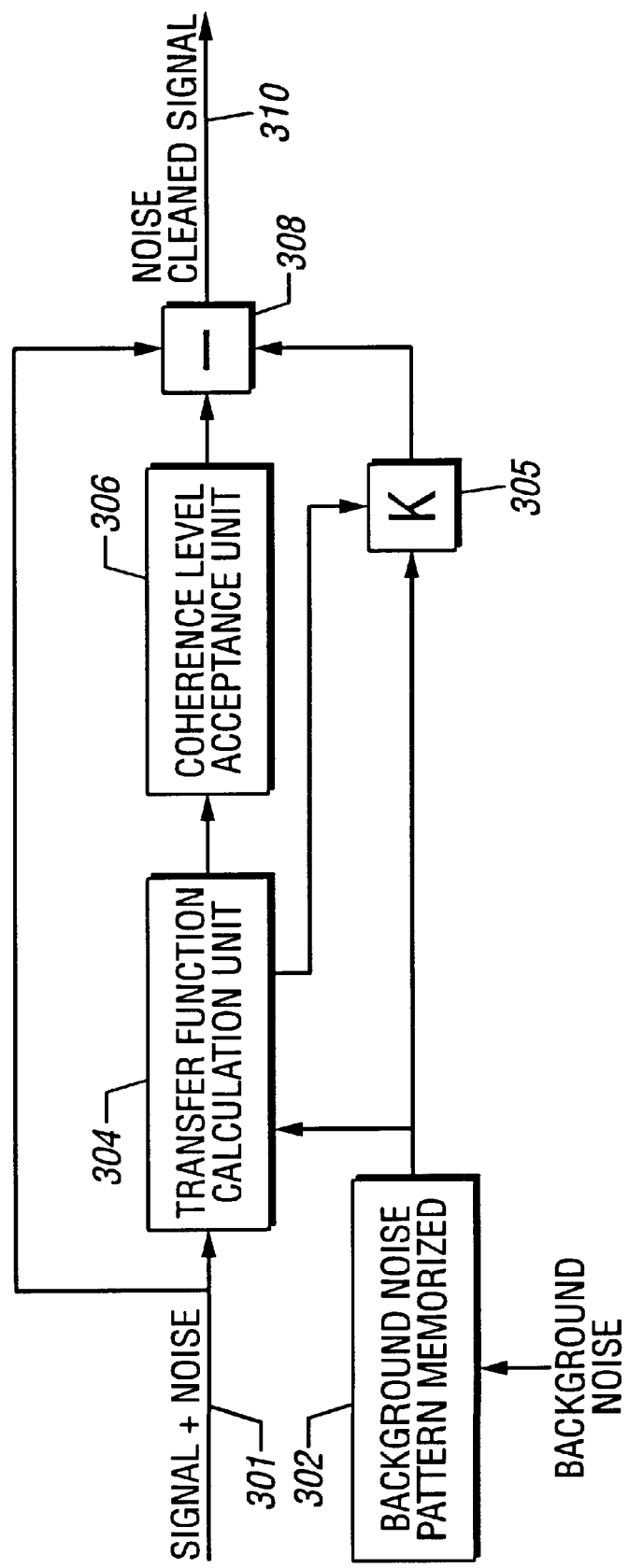

The system of the present invention preferably utilizes a technique for canceling the background noise that is not related to the acoustic source in the system. Such noise includes natural acoustic noise of the earth and random noise from the various sources around the wellbore, such as noise generated by vehicles and other surface drilling activities. FIG. 6 shows a functional block diagram of a preferred background cancellation method. This method assumes that the statistical parameters of the background noise remain the same during the period of downhole measurements, i.e., the noise remains stationary. Just before firing or activating the acoustic transmitter in the system, the system is programmed to record and memorize the background noise pattern in an associated memory as shown by block 302. Then during the investigation of the bed boundaries, the recorded noise pattern is correlated with the signals (signal+ noise) 301 received by the acoustic receivers of the system by calculating a transfer function by a transfer function calculation unit as shown in block 304. If a component of the received signals is strongly correlated with the noise pattern, such a component is removed from the received signals with a correcting scale coefficient k, block 305. The coefficient k is estimated based on the level of coherence between the received signal and the recorded noise. The signal from the transfer function calculation unit 304 is passed to a coherence level acceptance unit 306. The noise signal portion based on the coefficient k is removed from the output signal of the coherence level acceptance unit 306 as shown by subtractor block 308 to obtain a noise cleaned signal 310.

The present invention preferably utilizes the Cepstrum and Wavelet technique to detect small amplitude informative reflections combined with other non-informative reflections, such as reflections coming from the stabilizers, and having the same frequency content. Such informative signals are detected by utilizing a few time-to-frequency and reverse conversions along with logarithmic treatment for separating multiplicative components.

Figure 7:
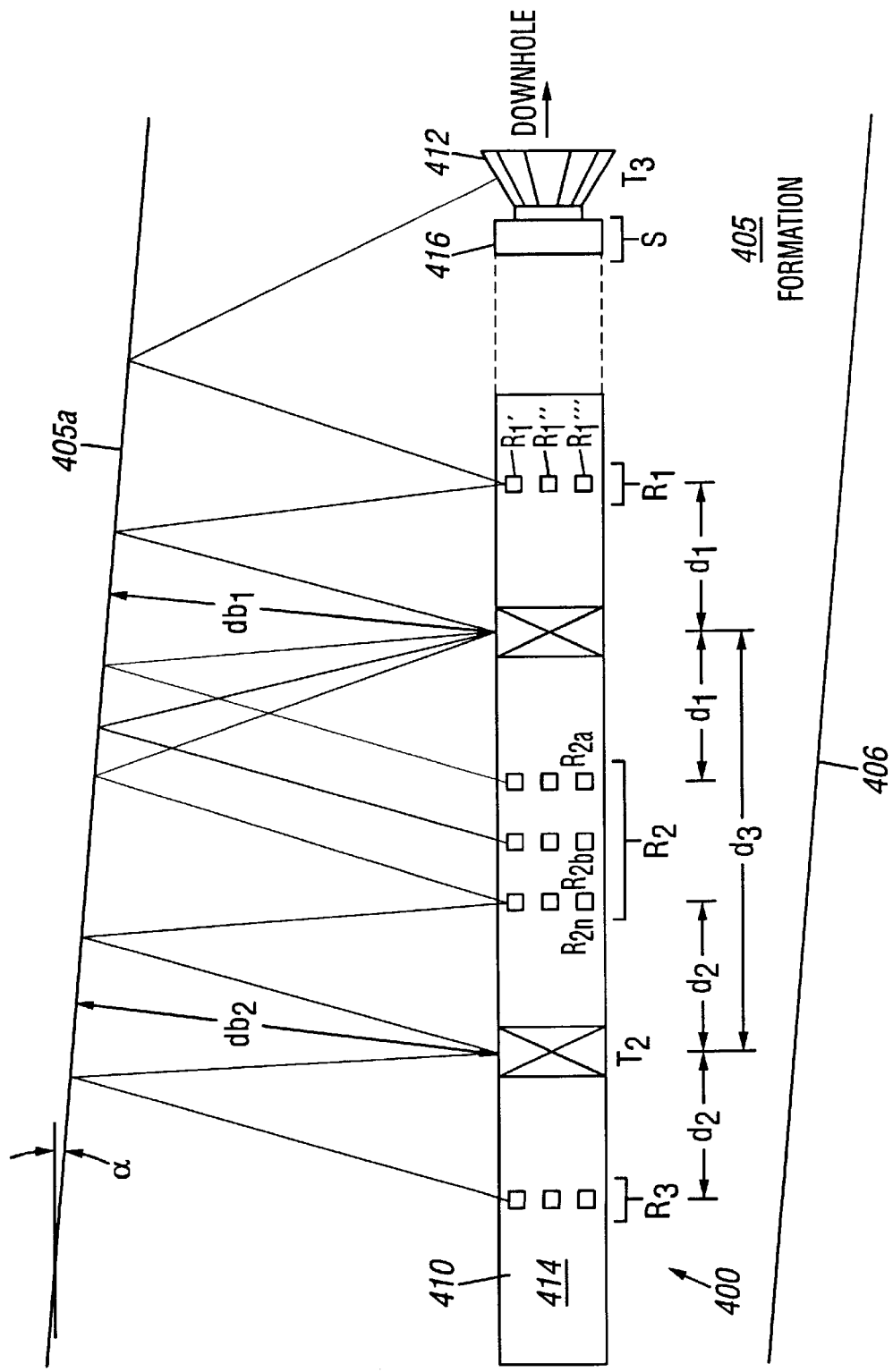
FIG. 7 is a schematic diagram of a drilling assembly having an acoustic MWD system in which the drill bit may be utilized as an acoustic transmitter.

FIG. 7 is a schematic diagram of a drilling assembly 400 disposed in a formation 405. The drilling assembly 400 includes a drill bit 412 at an end of the drilling assembly 400 and an acoustic MWD tool 410. The acoustic system 410 includes a housing or body 414. The acoustic tool 410 contains two spaced-apart transmitters $T_1$ and $T_2$, preferably disposed in the body 414. A pair of receivers $R_1$ and $R_2$ are disposed on either side of the transmitter T1. In the configuration shown in FIG. 7, the receiver $R_1$ is shown disposed downhole of the transmitter $T_1$ and the receiver $R_2$ is shown disposed uphole of the transmitter $T_1$. The receiver $R_1$ is shown to contain a plurality of individual acoustic sensors $R_1'$–$R_1'''$ circumferentially disposed around the tool 410. The receiver $R_2$ is shown to contain an array spaced-apart receivers $R_{2a}$–$R_{2n}$, each such receiver having a plurality of individual acoustic sensors circumferentially disposed around the tool body 414. The acoustic sensor arrangement of transmitter $T_1$ and receivers $R_1$ and $R_2$ combines certain functional characteristics of the arrangements described in reference to FIGS. 3a, 3b and 5a. The receiver $R_1$ and the receiver $R_{2a}$ of receiver $R_2$ are symmetrically disposed about the transmitter $T_1$, i.e, equidistant ($d_1$) from the transmitter $T_1$. The receivers $R_{2a}$–$R_{2n}$ in the array $R_2$ are preferably equispaced for ease of offsetting signals during processing of signals from such receivers.

The transmitter $T_1$ and receivers $R_1$ and $R_{2a}$ are utilized to measure the travel time of acoustic signal transmitted by transmitter $T_1$ and detected by receivers $R_1$ and $R_{2a}$, in the manner described earlier with respect to the symmetric arrangement shown in FIGS. 4, 5a and 5b. The transmitter T1 and the receivers $R_{2a}$–$R_{2n}$, are utilized to determine acoustic velocity of the formation being drilled in the manner described earlier with respect to transmitter $T_2$ and receiver 212 of FIG. 3a.

Still referring to FIG. 7, a second transmitter $T_2$ is shown disposed uphole of the receiver $R_2$ and a third receiver $R_3$ disposed uphole of the transmitter T2. The receiver $R_3$ and one of the receivers in the array $R_2$ are symmetrically disposed about the transmitter $T_3$ at a distance $d_2$. FIG. 7 is shown with receivers $R_3$ and $R_{2n}$ symmetrically disposed about the transmitter $T_2$. The acoustic sensor arrangement containing the transmitter $T_2$ and the receivers $R_3$ and $R_{2n}$ form a second symmetrical arrangement similar to the first symmetrical arrangement of transmitter $T_1$ and receivers $R_1$ and $R_{2a}$, but spaced apart by a predetermined distance $d_3$. The second symmetrical sensor arrangement is utilized to determine the bed boundary distance $d_{b2}$ in the same manner as the distance $d_{b1}$ is determined by the first symmetrical sensor arrangement. The distance or equivalently the acoustic travel times are then utilized to calculate the formation dip, which is typically defined by the angle alpha, by any of the methods well known in the art.

During drilling of the wellbore, the drill bit 412 produces acoustic energy, which is transmitted into the formation 405. Therefore, the drill bit can be utilized as a transmitter of acoustic energy to determine a parameter of interest during drilling. However, the acoustic energy transmitted by the drill bit does not produce a controlled and repeatable wave signature like the ones produced by commonly used transmitters in downhole acoustic tools. To compensate for such a deficiency, an acoustic receiver 416 is placed near the drill bit 412 to provide signals corresponding to the acoustic energy produced by the drill bit 412, from which the signature of the acoustic energy transmitted by the drill bit is determined by the processing or control circuit (see FIG. 1) by any known method. During drilling, the processing in the tool 400 determines and stores the signature of the acoustic energy transmitted by the drill bit 412 in an associated memory. One or more acoustic receivers ($R_1$–$R_3$) in the tool 400 are utilized to detect acoustic signals reflected by the formations or faults responsive to the acoustic energy transmitted by the drill bit 412. The detected signals are processed downhole or at the surface during drilling, utilizing the drill bit signal signature, to determine parameter of interest, such as the acoustic velocity and the travel time or equivalently, the distance between the drill bit 412 and subsurface reflection points, such as the bed boundary 405a or 405b, formation contrasts, or other faults. It will be obvious from the above description that the drill bit may be utilized in place of or in addition to one of the other transmitters to provide additional information.

The drill bit provides a source at the deepest point in the wellbore 405. It induces acoustic energy radially around the borehole (as shown by lines 413a) and in all other directions, including in the drilling direction (as shown by lines 413b). Any acoustic energy 413b' reflected back to the receivers in the tool 400 by reflection points, such as 415, downhole from the drill bit 412 can be processed to determine the location of such reflection points relative to the drill bit, thereby enabling the operator to look ahead about certain formation conditions. Additionally, acoustic sensors may be placed at the surface to detect signals generated by the drill bit and from subsurface reflectors in response thereto. Such detected signals can be processed to obtain seismic information about subsurface formations, which can be used to generate seismic maps or to update existing information.

In some applications, it may be preferred to utilize the resistivity measurements described earlier, which can look ahead for a relatively short distance, in conjunction with the sonic look-ahead measurements to obtain better definition of bed boundaries and water/oil separation ahead of the drill bit. This combined information is then used to steer the tool 400 to drill the borehole along the desired path.

Thus, the acoustic system of FIG. 7 includes one acoustic sensor arrangement ($T_1$, and $R_2$) for determining the acoustic velocity of the formation 405 surrounding the tool 400, a second acoustic sensor arrangement ($T_1$., $R_1$ and $R_2$) for determining the first bed boundary information (such as the acoustic travel time an/or the distance), and a third acoustic arrangement ($T_2$, $R_3$ and $R_2$) for determining the second bed boundary information, independent of the first bed boundary information. It should be noted that the acoustic sensor arrangement defined by the drill bit 412 as the transmitter and an appropriate number of receivers may be utilized in determining the acoustic velocities and/or the bed boundary information.

The information obtained from the acoustic tool 400 described above may be utilized to corroborate and/or update seismic data, borehole profile data stored in the tool 400 or at the surface by transmitting such information to the surface via a suitable telemetry associated with the drilling assembly 400. A downhole-controllable steering device (not shown) may be included in the tool as described in reference to FIG. 1. The control system in the tool 400 may include one or more processors which preferably utilize specific expert system algorithms, to generate specific steering instructions and cause the steering device to drill the borehole along a desired drill path. Alternatively, the tool 410 may transmit signals and data to the surface for use by an operator for system management or for transmittal to reservoir engineers located at great distances from the drilling site, for ultimate reservoir penetration. Such information is especially useful for highly deviated, horizontal and complex boreholes.

Figure 8:
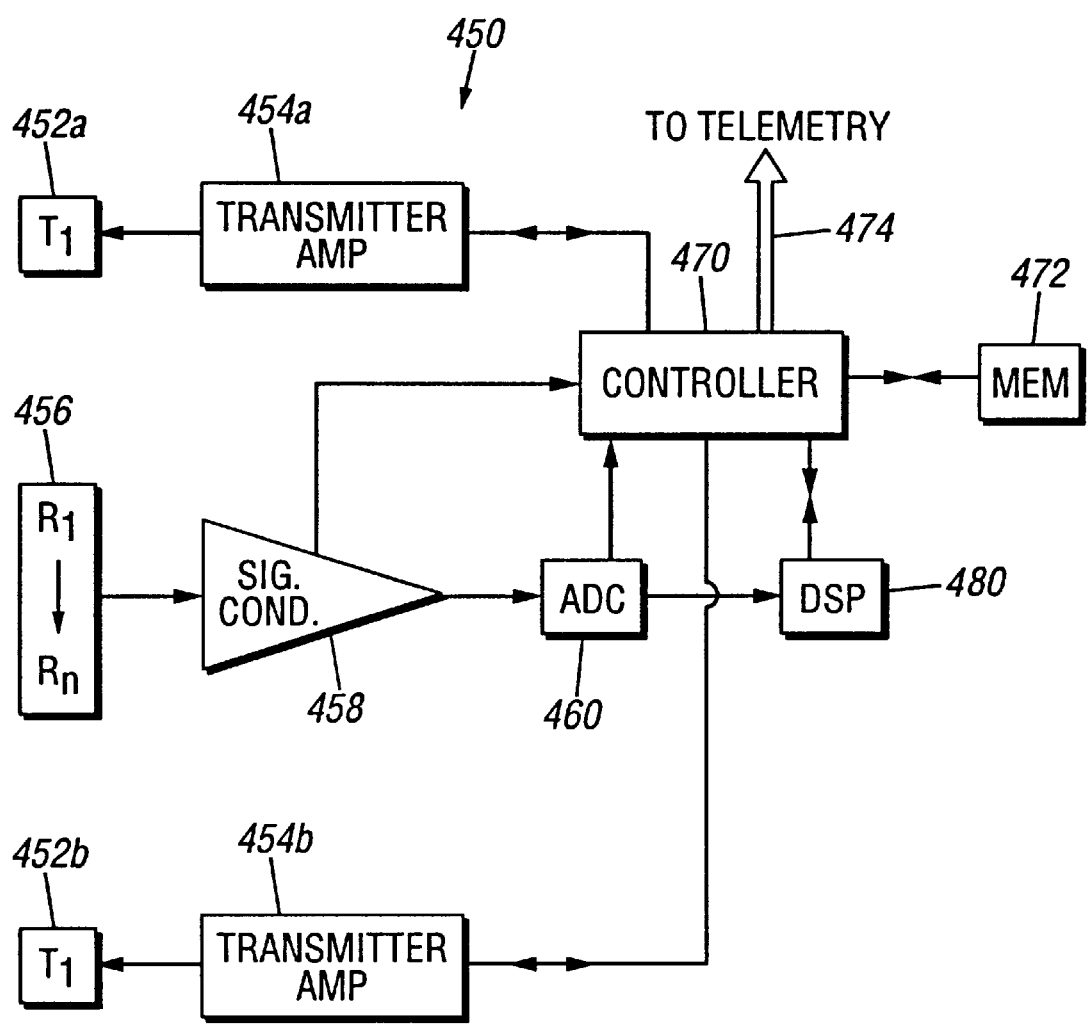
FIG. 8 is a functional block diagram of a signal processing circuit for processing acoustic data from the acoustic systems of the present invention.

FIG. 8 is a functional block diagram of a signal processing circuit 450 for use in the acoustic sensor system of the present invention. As an example, the processing circuit 450 in FIG. 8 is shown to contain two transmitters 452a and 452b and a plurality of receivers $R_1-R_n$ (collectively denoted by numeral 456). The processing circuit 450 contains a controller 470 (microprocessor or microcontroller) and associated memory 472, which may be composed of one or several memory types or units. Programmed instructions for the controller 470 for controlling the operation of the acoustic systems of the present invention as previously described are stored in the memory 472. Any other information, such as the desired borehole profile, seismic data or models, lookup tables, algorithms, etc. required for use by the controller is preferably stored in the memory 472. The controller 470 interfaces (sends and receives data and signals) with systems at the surface via a downhole telemetry system 474.

Each of the transmitters 452a and 452b are adapted to transmit acoustic signals at a frequency selected from a range of frequency and/or to sweep a desired range of frequency. An amplifier 454a coupled to the antenna 452a generates the desired signal to be transmitted by the transmitter 452a and an amplifier 454b for the transmitter 452b. During operations, the controller 474 causes the transmitters to generate the desired signals at the desired times according to programmed instructions. The receivers $R_1-R_n$ detect the acoustic signals. A signal conditioner 458 receives the signals detected by the receivers $R_1-R_n$, conditions such signals and passes the conditioned signals to an analog-to-digital converter (ADC) 460, which converts the conditioned signals to digital signals. The signal conditioner 458 may be composed of separate signal conditioners for each of the receivers $R_1-R_n$. The digital signals from the ADC are passed to a digital signal processor (DSP) 480, which processes such signals in response to the control instructions from the controller 470. Any suitable commercially available DSP and controller may be utilized for the purpose of this invention. The controller can be programmed to perform any number of tasks or operations. The controller 470 may be programmed to compute and/or determine the desired operating parameters, compare the drilling assembly position with the desired borehole profile, update seismic models stored downhole, cause the steering device to alter the drilling direction, determine the bed boundary information, compute formation velocities, compute sonic logs during drilling of the wellbore, store and/or transmit such information to the surface via the telemetry 474, etc., etc. The controller 470 may receive instructions or commands from the surface via the telemetry 474 to perform certain tasks and it may be programmed to transmit any information uphole via the telemetry 474.

Figure 9:
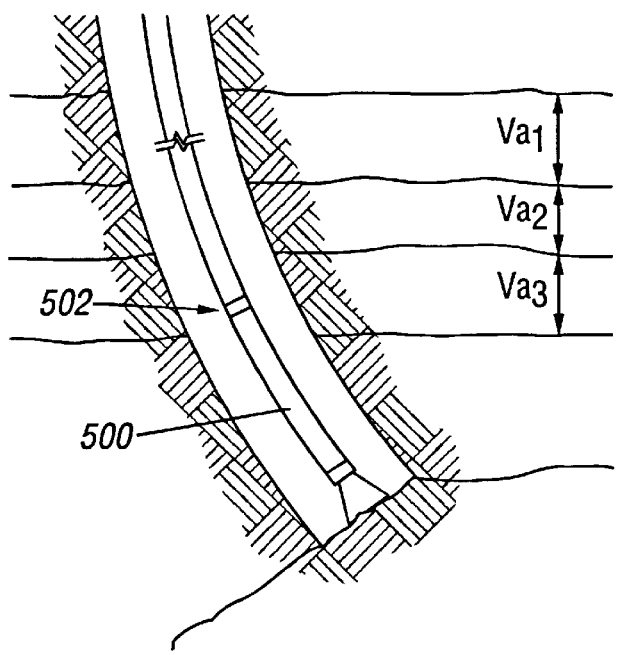
FIG. 9 is a schematic diagram showing subsurface formations along the wellbore being drilled having the acoustic system of the present for measuring the acoustic velocities of such formations during drilling of the wellbore.
Figure 10:
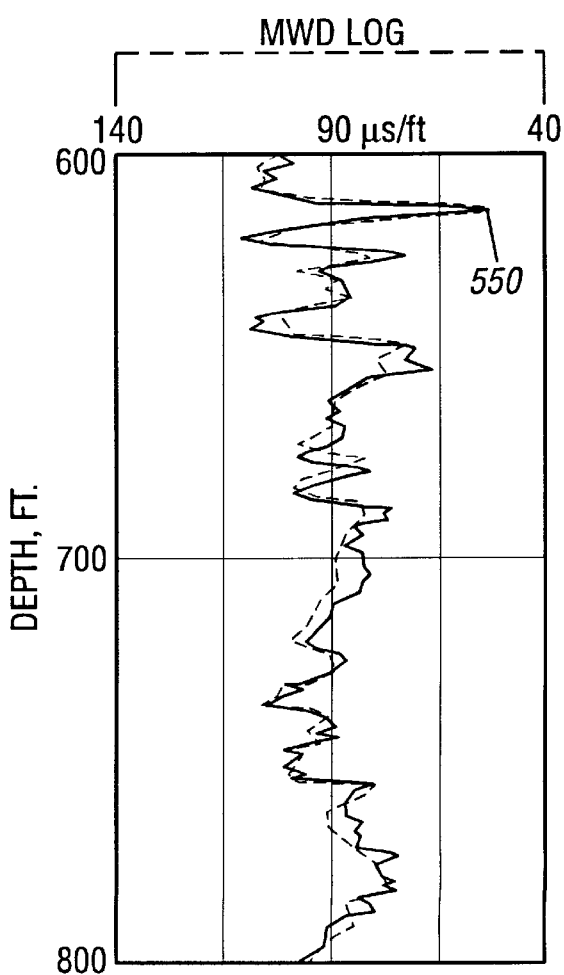
FIG. 10 is an example of a sonic log that can be produced during drilling of the borehole by the acoustic sensor system of the present invention.

FIGS. 9 and 10 illustrate determination of the acoustic velocities of the formations along the borehole and the computation of corresponding sonic logs, during drilling of the borehole. Referring to FIG. 9, as the drilling progresses, the acoustic system 500 in the drill string 502 determines the acoustic velocities of the formations, such as acoustic velocity Va1 for the formation I, acoustic velocity Va2 for the formation II, acoustic velocity Va3 for the formation III, in the manner described earlier. The acoustic velocities are depth correlated by the processing system in the downhole tool utilizing any known method to obtain accurate measure of the acoustic velocity corresponding to each of the formations and to delineate formation change. Resistivity measurements can be utilized to corroborate the change in formation. Since the actual acoustic velocities are measured as the drilling is progressing, such velocities can be used substantially in real time to aid in determining other parameters of interest during drilling of the wellbore. Such acoustic velocities can be utilized to update the seismic models, reservoir analysis, bed boundary information, while drilling.

FIG. 10 shows an example of a synthetic sonic log a 550 as a function of the borehole depth shown along the vertical direction. The acoustic system described above measures the acoustic velocities and determines the sonic log while drilling. The log can be stored in the downhole tool and/or transmitted uphole while drilling for use at the surface by the driller or a log analyst.

As described earlier, the acoustic measurements according to the present invention provide bed boundary information around the borehole being drilled. The acoustic system provides substantially deeper depth of investigation compared to the resistivity techniques. The downhole computer or controller is programmed to compute and map the bed boundary around the downhole assembly. Such information can be utilized by the driller to continually steer the drill bit along the desired direction. The bed boundary information enables the driller to maintain the drill bit at a desired distance from the bed boundary. It enables the driller to avoid penetrating undesired formations, which sometimes can require the driller to retrieve the drill string from the borehole and/or make other corrective adjustments, which are time consuming and produce wellbores having dogleg severities. The downhole assembly also may include a device for providing resistivity measurements of the formations, such as described in the U.S. Pat. No. 5,325,714 to Lende. Such measurements can be used in conjunction with the acoustic measurements to further improve the steering of the drill bit along the desired drill path.

The downhole subassembly of the present invention may be adapted to include downhole devices which may be activated by the downhole computing system to continuously locate the wellbore at optimum location within the formation. U.S. patent application Ser. No. 08/544,422 by Kruger et al. now abandoned discloses a closed loop system for steering the drill string by without retrieving the drill downhole subassembly, which is incorporated herein by reference. The present invention may be adapted to utilize such a steering system.

The present invention also utilizes the acoustic sensor data in combination with the directional data to build or map a three dimensional picture of the reflecting surfaces (bed boundaries) after a certain amount of data has been collected during the drilling process. The distance between the downhole assembly and the reflector is computed by the downhole computing system for a known tool face (reference angle in the plane perpendicular to the drill string). Such data is correlated by the downhole computing system 150 with the azimuth and inclination of the downhole subassembly. This enables the system to build a point-by-point absolute three dimensional coordinates of the reflector. In this method, the level of uncertainty decreases as the accuracy of the estimation increases when a sufficiently large number of points have been calculated.

The foregoing description is directed to particular embodiments of the present invention for the purpose of illustration and explanation. It will be apparent, however, to one skilled in the art that many modifications and changes to the embodiment set forth above are possible without departing from the scope and the spirit of the invention. It is intended that the following claims be interpreted to embrace all such modifications and changes.

What is claimed is:

1. A downhole tool for use in drilling of a wellbore, comprising:
   (a) a transmitter transmitting acoustic signals at a first frequency and a second frequency into a formation surrounding the borehole during drilling of the wellbore;
   (b) at least one receiver detecting signals transmitted by the transmitter; and
   (c) a processor carried by the tool, said processor determining:
      (i) downhole acoustic velocity of the subsurface formation from the at least one receiver signals at the first frequency, and
      (ii) distance between the tool and a subsurface reflection point from the determined acoustic velocity and the at least one receiver signal at the second frequency during drilling of the wellbore.

2. The downhole tool according to claim 1, wherein the at least one receiver includes a far receiver which is utilized for determining said acoustic velocity.

3. The downhole tool according to claim 2, wherein the far receiver includes a plurality of axially spaced acoustic sensors, each such sensor detecting acoustic signals reflected by the reflection point.

4. The downhole tool according to claim 3, wherein at least one acoustic sensor in the plurality of sensors is utilized for determining the travel time.

5. The downhole tool according to claim 3, wherein each axially spaced acoustic sensor contains a plurality of receiver elements circumferentially disposed around the downhole tool.

6. The downhole tool according to claim 2, wherein the at least one receiver further includes a near receiver which is utilized for determining the travel time.

7. The downhole tool according to claim 6, wherein the near receiver includes at least two acoustic sensors symmetrically disposed about the transmitter in the downhole tool for reducing the effect on the near receiver of signals other than the acoustic signals reflected from the reflection point.

8. The downhole tool according to claim 6 further comprising an isolator between the transmitter and the near receiver for reducing the effect of acoustic waves traveling in the downhole tool on the near receiver.

9. The downhole tool according to claim 1, wherein the near receiver includes a plurality of axially spaced acoustic sensors along the downhole tool.

10. The downhole tool according to claim 1, wherein the receiver comprises:
    (I) a far receiver having least one acoustic sensors along the downhole tool; and
    (II) a near receiver containing a plurality of axially spaced acoustic sensors along the downhole tool.

11. The downhole tool according to claim 10, wherein the distance between the transmitter and a reference point of the far receiver is greater than the distance between the transmitter a reference point the near receiver.

12. A downhole tool for use in drilling of a wellbore, comprising:
    (a) a first acoustic sensor arrangement disposed in the downhole tool for determining acoustic velocity of a formation around the wellbore during drilling of the wellbore based upon signals transmitted by a transmitter in the first sensor arrangement at a first frequency; and
    (b) a second acoustic sensor arrangement disposed in the downhole tool for measuring acoustic travel time between the downhole tool and a subsurface reflection point based on signals transmitted by a transmitter in the second sensor arrangement at a second frequency.

13. The downhole tool according to claim 12, wherein the first acoustic sensor arrangement further comprises a receiver and the second acoustic sensor arrangement further comprises a plurality of receivers.

14. The downhole tool according to claim 13, wherein the transmitter in the first and second acoustic sensor arrangements is a common transmitter.

15. The downhole tool according to claim 12, wherein the distance between the transmitter and the receiver in the first acoustic sensor arrangement is substantially less than the distance between the transmitter and receiver in the second acoustic sensor arrangement.

16. The downhole tool according to claim 12, wherein the second acoustic sensor arrangement includes two acoustic sensors symmetrically disposed about the transmitter of the second acoustic arrangement.

17. The downhole tool according to claim 16 further comprising an acoustic isolator disposed between the transmitter of the second acoustic arrangement and each of the two symmetrically disposed acoustic sensors for reducing the effect of body waves.

18. The downhole tool according to claim 16, wherein one of the two acoustic sensors acts as the receiver of the first acoustic arrangement.

19. The downhole tool according to claim 12 further having a device selected from a group consisting of a (i) device for determining porosity of the formation around the downhole tool during drilling of the wellbore, (ii) device for determining density of the formation around the downhole tool during drilling of the wellbore, and (iii) device for determining the resistivity of the formation, a device for determining the inclination of the tool in the wellbore and a nuclear device.

20. The downhole tool according to claim 12, wherein the receiver in the first and second acoustic sensor arrangements is a common array having a plurality of axially spaced acoustic sensors.

21. The downhole tool according to claim 20, wherein the receiver in the first and second acoustic sensor arrangements is a common array of a plurality of axially spaced acoustic sensors.

22. The downhole tool according to claim 12, wherein the transmitters in the first and second acoustic sensor arrangements are disposed on either side of the array, with the distance between the transmitter of the first acoustic sensor arrangement and a center of the array being less than the distance between the transmitter of the second acoustic sensor arrangement and a selected sensor in the array.

23. The downhole tool according to claim 12, further comprising processor for receiving signals from the first and second acoustic sensor arrangements and in response thereto determining the location of a formation boundary relative to the downhole tool.

24. The downhole tool according to claim 23, wherein the processor first determines the acoustic velocities and then utilizess such computed velocities to determine the bed boundaries.

25. The downhole tool according to claim 23 wherein the processor contains a computer and an associated memory.

26. The downhole tool according to claim 25, wherein the processor determines a three dimensional map of the bed boundaries of the formation around the downhole tool.

27. The downhole tool according to claim 24, wherein the processor includes a predetermined profile of the location of the wellbore in the formation.

28. The downhole tool according to claim 27, wherein the processor updates the wellbore profile based on the bed boundary information.

29. A drilling assembly for use in drilling of a wellbore, comprising:
 (a) a drill bit at an end of the drilling assembly for drilling the wellbore;
 (b) an acoustic device having a transmitter for transmitting acoustic signals at a first frequency and a second frequency in the wellbore during drilling of the wellbore and a receiver for detecting signals transmitted by the transmitter;
 (c) a processing system associated with the drilling assembly for processing signals from the receiver at the first frequency for determining an acoustic velocity of a formation surrounding the wellbore and at the second frequency for determining a travel time from the drilling assembly to a subsurface reflection point; and
 (d) a steering device disposed in the drilling assembly for altering direction of drilling the wellbore by the drill bit.

30. The drilling assembly according to claim 29, wherein the steering devise includes a plurality of independently controllable members, each said member adapted to extend outwardly from the drilling assembly.

31. The drilling assembly according to claim 24 further comprising a drilling motor disposed between the drill bit and the acoustic device for rotating the drill bit when a pressurized fluid is passed through the drilling motor.

32. The drilling assembly according to claim 31 wherein the steering device is disposed between the drill bit and the mud motor.

33. The bottomhole assembly according to claim 29 further comprising a resistivity device for determining the presence of hydrocarbon bearing formations during drilling of the wellbore.

34. The bottomhole assembly according to claim 29 further comprising a nuclear device for determining nuclear porosity of the formation around the drilling assembly during drilling of the wellbore.

35. The drilling assembly according to claim 34 further comprising a device for determining density of the formation around the drilling tool during drilling of the wellbore.

36. The drilling assembly according to claim 29, wherein the processing system:
 (i) includes a well profile;
 (ii) determines the position of the drilling assembly relative to the well profile; and
 (iii) generates a signal representative of a difference between the well profile and the drilling assembly position.

37. The drilling assembly according to claim 36, wherein the processing system causes the steering device to alter the drilling direction in response to the generated signal so as to maintain drilling of the wellbore along the wellbore profile.

38. The drilling assembly according to claim 29, wherein the processing system determines a three dimensional map of the bed boundaries of the formation around the downhole tool.

39. The drilling assembly according to claim 29 further having a wellbore profile stored in a memory in the drilling assembly.

40. The drilling assembly according to claim 36, wherein the processing system determines the location of the drilling assembly in relation to a boundary of the formation surrounding the drilling assembly.

41. The drilling assembly according to claim 40, wherein the processing system updates the wellbore profile based on the bed boundary information.

42. The drilling assembly according to claim 29, wherein the processing system determines a three dimensional map of the bed boundaries of the formation around the downhole tool.

43. The drilling assembly according to claim 29 further comprising a sensor disposed in the drilling assembly near the drill bit for determining characteristics of acoustic signals transmitted by the drill bit during drilling of the wellbore.

44. The drilling assembly according to claim 43, wherein the processing system receives signals from at least one receiver in the acoustic device that are responsive to acoustic signals transmitted by the drill bit during drilling of the wellbore and processes such received signals based on the characteristics of the acoustic signals transmitted by the drill bit to (a) determine the position of the drilling assembly relative to a subsurface formation boundary, (b) update a wellbore profile provided to the drilling assembly or (c) obtain a seismograph of the subsurface formations surrounding the drilling assembly.

45. A downhole tool for use in drilling of a wellbore, comprising:
 (a) an acoustic transmitter disposed in the downhole tool for transmitting acoustic signals into a formation surrounding the wellbore during drilling of the wellbore;
 (b) a pair of acoustic receivers symmetrically disposed about the transmitter, said receivers detecting at least acoustic signals reflected by a subsurface reflection point in the formation in response to the transmitted signals, and
 (c) a processor using said symmetric disposition to reduce the effect of acoustic signals other than the acoustic signals reflected by the subsurface reflection point in the formation.

46. The downhole tool according to claim 45 wherein the processor incorporates the subtraction of the acoustic signal detected by one of the pair of acoustic receivers from the acoustic signal detected by the other of the pair of acoustic receivers.

47. The downhole tool according to claim 45, wherein the processor is adapted to cause the transmitter to operate at a frequency selected from a range of frequencies.

48. The downhole tool according to claim 45 further comprising an acoustic isolator disposed between the transmitter and each of the acoustic receivers for reducing the effect of acoustic signals transmitted by the transmitter that travel through the downhole tool.

49. A downhole tool for use in drilling of a wellbore in a formation, comprising:
 (a) a first acoustic sensor arrangement including at least one transmitter and at least one acoustic receiver for providing signals indicative of acoustic velocity of a formation surrounding the wellbore;
 (b) a second acoustic sensor arrangement including a transmitter and a pair acoustic receivers substantially symmetrically disposed about the transmitter for providing a pair of signals indicative of a first position of the downhole tool relative to a subsurface bed boundary in the formation; and (c) a processor for
  (i) determining an acoustic velocity of the formation from the first acoustic sensor arrangement, and
  (ii) determining the first position of the downhole tool relative to the subsurface bed boundary from the determined acoustic velocity and the pair of signals from the second acoustic sensor arrangements.

50. The downhole tool according to claim 49 further comprising a third acoustic sensor arrangement having a transmitter and a pair of acoustic receivers for providing a pair of signals indicative of a second position of the downhole tool relative to the subsurface bed boundary.

51. The downhole tool according to claim 50, wherein the processor utilizes the pair of signals from the third acoustic sensor arrangements to determine the second position of the downhole tool relative to the subsurface bed boundary.

52. The downhole tool according to claim 51, wherein the processor determines dip of the subsurface formation bed boundary from the first and second positions of the downhole tool.

53. The downhole tool of claim 49 wherein the first sensor arrangement and the second sensor arrangement have at least one receiver in common.

54. The downhole tool of claim 49 wherein the first sensor arrangement and the second sensor arrangement have at least one transmitter in common.

55. The downhole tool of claim 49 wherein the wherein the processor incorporates the subtraction of the signal provided by one of the pair of acoustic sensors from the signal provided by the other of the pair of acoustic sensors.

56. The downhole tool of claim 49, the second sensor arrangement further comprising an acoustic isolator disposed between the transmitter and each of the acoustic receivers for reducing the effect of acoustic signals transmitted by the transmitter that travel through the downhole tool.

57. The downhole tool of claim 49 wherein the at wherein the at least one acoustic receiver in the first sensor arrangement includes a far receiver that is utilized for determining said acoustic velocity.

58. The downhole tool of claim 57 wherein the far receiver includes a plurality of spaced apart acoustic sensors, each such sensor detecting transmitted acoustic signals traveling parallel to the wellbore.

59. The downhole tool of claim 58, wherein each acoustic sensor contains a plurality of receiver elements circumferentially disposed around the downhole tool.

60. The downhole tool according to claim 57, wherein the distance between a transmitter and the far receiver in the first acoustic sensor arrangement is substantially less than the distance between the transmitter and an acoustic receiver in the second acoustic sensor arrangement.

61. The downhole tool according to claim 49 further having a device selected from a group consisting of a (i) device for determining porosity of the formation around the downhole tool during drilling of the wellbore, (ii) device for determining density of the formation around the downhole tool during drilling of the wellbore, and (iii) device for determining the resistivity of the formation, a device for determining the inclination of the tool in the wellbore and a nuclear device.

62. The downhole tool according to claim 49, wherein the processor further determines a three dimensional map of the bed boundaries of the formation around the downhole tool.

63. A downhole tool for use in drilling of a wellbore in a formation, comprising:
  (a) an acoustic sensor arrangement including a transmitter and a pair acoustic receivers substantially symmetrically disposed about the transmitter for providing signals indicative of a first position of the downhole tool relative to a subsurface bed boundary in the formation; and
  (c) a processor for determining the first position of the downhole tool relative to the subsurface bed boundary from an acoustic velocity of the formation and signals from the acoustic sensor arrangement.

64. A drilling assembly for use in drilling of a wellbore, comprising:
  (a) a drill bit at an end of the drilling assembly for drilling the wellbore;
  (b) a first acoustic sensor arrangement including at least one transmitter and at least one acoustic receiver for providing signals indicative of acoustic velocity of a formation surrounding the wellbore;
  (c) a second acoustic sensor arrangement including a transmitter and a pair acoustic receivers substantially symmetrically disposed about the transmitter for providing signals indicative of a first position of the downhole tool relative to a subsurface bed boundary; and
  (d) a processor for:
    (i) determining an acoustic velocity of the formation from the first acoustic sensor arrangement, and
    (ii) determining the first position of the downhole tool relative to the subsurface bed boundary from the determined acoustic velocity and signals from the second acoustic sensor arrangements, and
    (iii) controlling a steering device disposed in the drilling assembly to alter the direction of drilling of the wellbore by the drill bit in response to said determined first position.

65. A method of drilling a borehole in a formation utilizing a downhole tool having a first and second acoustic sensor arrangements during drilling of the borehole, comprising:
  (a) conveying the downhole tool in the borehole;
  (b) using the first sensor arrangement to provide signals indicative of the acoustic velocity of the formation;
  (c) using a transmitter in the second sensor arrangement to transmit acoustic signals into the formation;
  (d) detecting acoustic signals reflected by a subsurface bed boundary by a pair of acoustic receivers disposed substantially symmetrically about the transmitter in the second sensor arrangement;
  (e) using the processor to determine the acoustic velocity of the formation from the signals provided by the first sensor arrangement; and
  (f) using the processor to determine a position of the subsurface bed boundary in the formation from the determined acoustic velocity and the signals detected by the pair of acoustic receivers.

* * * * *

UNITED STATES PATENT AND TRADEMARK OFFICE
CERTIFICATE OF CORRECTION

Page 1 of 3

PATENT NO. : 6,088,294
DATED : July 11, 2000
INVENTOR(S) : James V. Leggett, III, Vladimir Dubinsky, John W. Harrell, William Thomas Balogh, Paul J. G. Seaton, Andrew G. Brooks and Roger P. Herbert It is certified that error appears in the above-indentified patent and that said Letters Patent is hereby corrected as shown below:

ON THE TITLE PAGE:
Item 54 and Col. 1, lines 1-5

Please delete Title "DRILLING SYSTEM WITH AN ACOUSTIC MEASUREMENT-WHILE-DRIVING SYSTEM FOR DETERMINING PARAMETERS OF INTEREST AND CONTROLLING THE DRILLING DIRECTION"

Replace with --DRILLING SYSTEM WITH AN ACOUSTIC MEASUREMENT-WHILE-DRILLING SYSTEM FOR DETERMINING PARAMETERS OF INTEREST AND CONTROLLING THE DRILLING DIRECTION--

Items [56] References Cited and item [57] Abstract:

Front page, column 2, "Other Publications": delete J. Aron, et al. Sonic "Compressional", should read --J. Aron, et al. "Sonic Compressional"--.

Front page, column 2, "Other Publications": Aron et al., is a repeat of the earlier citation.

Front page, line 6 of ABSTRACT: delete "borehole ad and acoustic", should read -- borehole and an acoustic--.

UNITED STATES PATENT AND TRADEMARK OFFICE
CERTIFICATE OF CORRECTION

PATENT NO. : 6,088,294
DATED : July 11, 2000
INVENTOR(S) : James V. Leggett, III, Vladimir Dubinsky, John W. Harrell, William Thomas Balogh, Paul J. G. Seaton, Andrew G. Brooks and Roger P. Herbert It is certified that error appears in the above-indentified patent and that said Letters Patent is hereby corrected as shown below:

ON THE TITLE PAGE
Item [56] References Cited and item [57] Abstract:

Column 1, line 10: delete "takes priorit form", should read -- takes priority from--.

Column 1, line 28: delete "bed bounadry", should read --bed boundary--.

Column 2, line 9: delete "three-dimemsional", should read -- three-dimensional--.

Column 4, line 29: delete "ad then utilizes", should read --and then utilizes--.

Column 8, line 20: delete "neutron energy delay" should read --neutron energy decay--.

Column 12, lines 43-44: delete "Casual feedforward" and "casual feedback", should read -- causal feedforward-- and --causal feedback--.

Column 19, line 36: delete "steering devise" should read --steering device--.

Column 21, line 30: delete "wherein the wherein the", should read --wherein the--.

UNITED STATES PATENT AND TRADEMARK OFFICE
CERTIFICATE OF CORRECTION

PATENT NO. : 6,088,294        Page 3 of 3
DATED     : July 11, 2000
INVENTOR(S) : James V. Leggett et al.

It is certified that error appears in the above-indentified patent and that said Letters Patent is hereby corrected as shown below:

Column 21, line 40: delete "wherein the at wherein the", should read "wherein--.

Signed and Sealed this

Sixth Day of March, 2001

Attest:

NICHOLAS P. GODICI

Attesting Officer       Acting Director of the United States Patent and Trademark Office